US011475111B2

(12) United States Patent
Madishetti et al.

(10) Patent No.: US 11,475,111 B2
(45) Date of Patent: Oct. 18, 2022

(54) METHOD AND SYSTEM FOR PRO-ACTIVE DESKTOP RESUME OPERATION BASED ON HISTORICAL DATA

(71) Applicant: Workspot, Inc., Campbell, CA (US)

(72) Inventors: Shiva Madishetti, Campbell, CA (US); Lisa Wing San Chui, Campbell, CA (US); Anushree Kunal Pole, Campbell, CA (US); Edward A. Seidman, Campbell, CA (US); Virabrahma Prasad Krothapalli, Campbell, CA (US); Amitabh Bhuvangyan Sinha, Campbell, CA (US); Jimmy Chang, Campbell, CA (US); David T. Sulcer, Campbell, CA (US)

(73) Assignee: Workspot, Inc., Campbell, CA (US)

( * ) Notice: Subject to any disclaimer, the term of this patent is extended or adjusted under 35 U.S.C. 154(b) by 574 days.

(21) Appl. No.: 16/593,782

(22) Filed: Oct. 4, 2019

(65) Prior Publication Data

US 2021/0103644 A1 Apr. 8, 2021

(51) Int. Cl.
| | |
|---|---|
| *H04L 9/40* | (2022.01) |
| *G06F 21/31* | (2013.01) |
| *G06F 9/451* | (2018.01) |
| *G06N 5/04* | (2006.01) |
| *G06N 20/00* | (2019.01) |

(52) U.S. Cl.
CPC ............ *G06F 21/316* (2013.01); *G06F 9/452* (2018.02); *G06N 5/04* (2013.01); *G06N 20/00* (2019.01); *H04L 63/08* (2013.01)

(58) Field of Classification Search
CPC ....... G06F 21/316; G06F 9/452; G06N 20/00; G06N 5/04; H04L 63/08
See application file for complete search history.

(56) References Cited

U.S. PATENT DOCUMENTS

| | | | |
|---|---|---|---|
| 10,122,828 B1* | 11/2018 | Verma ................. | H04L 61/5061 |
| 10,841,316 B2* | 11/2020 | Innes ................. | G06F 21/6218 |
| 10,848,568 B1* | 11/2020 | Ozerov ................. | H04L 67/14 |
| 2013/0007465 A1* | 1/2013 | Movassaghi ............ | G06F 21/34 |
| | | | 713/185 |
| 2013/0103973 A1* | 4/2013 | Werth ................. | H04L 41/0816 |
| | | | 714/2 |
| 2017/0201588 A1* | 7/2017 | Schmidt ................ | H04L 63/105 |
| 2017/0344392 A1* | 11/2017 | Ulatoski ............... | G06F 9/4451 |
| 2018/0165163 A1* | 6/2018 | Hegdal ............... | G06F 11/1612 |
| 2018/0295033 A1* | 10/2018 | Vladimirskiy ........ | G06F 9/5083 |
| 2020/0034169 A1* | 1/2020 | Deore ................. | G06F 9/45558 |
| 2020/0125419 A1* | 4/2020 | Zhang ................. | G06F 9/45533 |

* cited by examiner

*Primary Examiner* — Ghodrat Jamshidi
(74) *Attorney, Agent, or Firm* — Nixon Peabody LLP (57) ABSTRACT

A system and method for resuming a remote desktop for a networked client device. An access control system accepts login data from a user input to a networked client device, and/or user activity data collected by an agent running on the desktop. The networked client device may include a client application. A data center allows access to an activated desktop to the networked client device. The access control system suspends the desktop when the user is inactive in operating the client device. The access control system resumes the desktop on the networked client device in relation to a predicted start time. The predicted start time is based on login data from past logins by the user on networked client devices.

23 Claims, 7 Drawing Sheets

METHOD AND SYSTEM FOR PRO-ACTIVE DESKTOP RESUME OPERATION BASED ON HISTORICAL DATA

TECHNICAL FIELD

The present disclosure relates generally to network-based systems. More particularly, aspects of this disclosure relate to power saving by predicting the times remote desktops and/or remote applications are used and providing suspension and resumption of their operation based on the predicted use times.

BACKGROUND

Computing systems that rely on applications operated by numerous networked computers are ubiquitous. Information technology (IT) service providers thus must effectively manage and maintain very large-scale infrastructures. An example enterprise environment may have many thousands of devices and hundreds of installed software applications to support. The typical enterprise also uses many different types of central data processors, networking devices, operating systems, storage services, data-backup solutions, cloud services, and other resources.

Users of networked computers, such as in a cloud-based system, may typically log into a computer workstation or client device and are provided a desktop application that displays an interface of desktops available via the network or cloud. A "desktop" is any form of desktop virtualization in which the desktop and/or a specific application are running in a virtual environment in a remote location, typically on a public computing cloud. Such desktops will be initially accessed when a user logs in. While users may connect to the desktop on any computer on the network, most users work from one specific computer. When a desktop is available for use, such a desktop is considered "activated." When the desktop is made unavailable for use, in order to conserve resources, the desktop is considered "suspended." When a desktop that had been suspended is activated again, the desktop is considered "resumed." Currently, the desktop is activated on-demand from the cloud or network. Typically, this process involves waiting for the user to launch the client on a networked computer and attempt to access the desktop before the desktop is activated.

Some users prefer to leave the desktop activated all the time to make it available to the user at any time. However, leaving the desktops activated all the time is not a cost-effective way to provide cloud-based desktops, as the virtual computing devices consume power and computing resources while they wait for users to actually use the desktop. One solution is to automatically suspend the desktop after a predetermined time. However, if the desktops are suspended during the non-active hours, a user has to wait for the desktop to resume before he or she can start working during the regular active hours.

Thus, there is a need for a system that predicts when a user may require a desktop in a network or cloud-based system and then activate the desktop just prior to when a user may require the desktop. There is a further need for a system that conserves power and system resources by only activating a desktop when it is likely a user will require the desktop. There is a further need for a routine that determines active periods for network users and adjusts the suspension of the desktop depending on whether inactivity occurs within an active period. There is a further need to determine multiple user profiles to determine optimal times to activate servers at a data center in accordance with predicted times for when groups of users access their respective desktops.

SUMMARY

One disclosed example is a system resuming a remote desktop accessed by a networked client device. The system includes a control system accepting login data from a user input to a networked client device. A remote server allows a stored desktop to be accessed by the networked client device when the control system validates the login data from the user input. The control system suspends the desktop when the user is inactive in operating the client device. The control system is operable to activate the desktop for the networked client device in relation to a predicted start time. The predicted start time is based on login data from past logins by the user on one or more client devices.

Another disclosed example is a method of activating a desktop on an idle client device operating a client application in a network system. Login data from a user input to the client device is accepted via a control system. The login data from the user is validated. Access to a desktop on a remote server is allowed to the networked client device from over the network. The desktop is suspended when the user is inactive in operating the client device. The desktop for the networked client device is activated in relation to a predicted start time. The predicted start time is based on login data from past logins by the user on one or more client devices.

Another disclosed example is a system that determines a time to activate a desktop for a networked client device. An access control system accepts login data from a user input to the networked client device. A remote server stores a desktop that is accessed by the networked client device when the control system validates the login data from the user input. The control system is operable to determine a predicted start time associated with the user. The predicted start time is based on login data from past logins by the user on networked client devices.

The above summary is not intended to represent each embodiment or every aspect of the present disclosure. Rather, the foregoing summary merely provides an example of some of the novel aspects and features set forth herein. The above features and advantages, and other features and advantages of the present disclosure will be readily apparent from the following detailed description of representative embodiments and modes for carrying out the present invention when taken in connection with the accompanying drawings and the appended claims.

BRIEF DESCRIPTION OF THE DRAWINGS

The disclosure will be better understood from the following description of exemplary embodiments together with reference to the accompanying drawings, in which.

The present disclosure is susceptible to various modifications and alternative forms. Some representative embodiments have been shown by way of example, in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present disclosure relates to a routine that predicts when a desktop may be required and activates desktops for different users in relation to the prediction of network user patterns. Using simple machine-learning techniques, the routine creates a model and predicts what time a user will require the use of a desktop during the active hours each day in a week. The system will automatically resume the suspended desktop at a predetermined time, such as thirty (30) minutes (or whatever is configured) before the start of the predicted active hour when a user will require the desktop.

The routine will further suspend the desktop after the first disconnect/logoff during an inactive period. The disconnect may be by an explicit user disconnect from a workstation or a disconnect triggered through the idle period of the desktop during inactive hours. The model is built upon simple machine-learning techniques which are easy to implement. In this example, the model builds a separate profile for each user of a networked system based on their working patterns using workstations. The model can be easily customized with preferred configurations. The system may also use the compiled user profiles in relation to predicted needs for the desktops and other applications. The predicted times may also be used to allocate and activate other network resources such as application server instances in a cluster, or the size of a pool of non-persistent desktops.

Figure 1A:
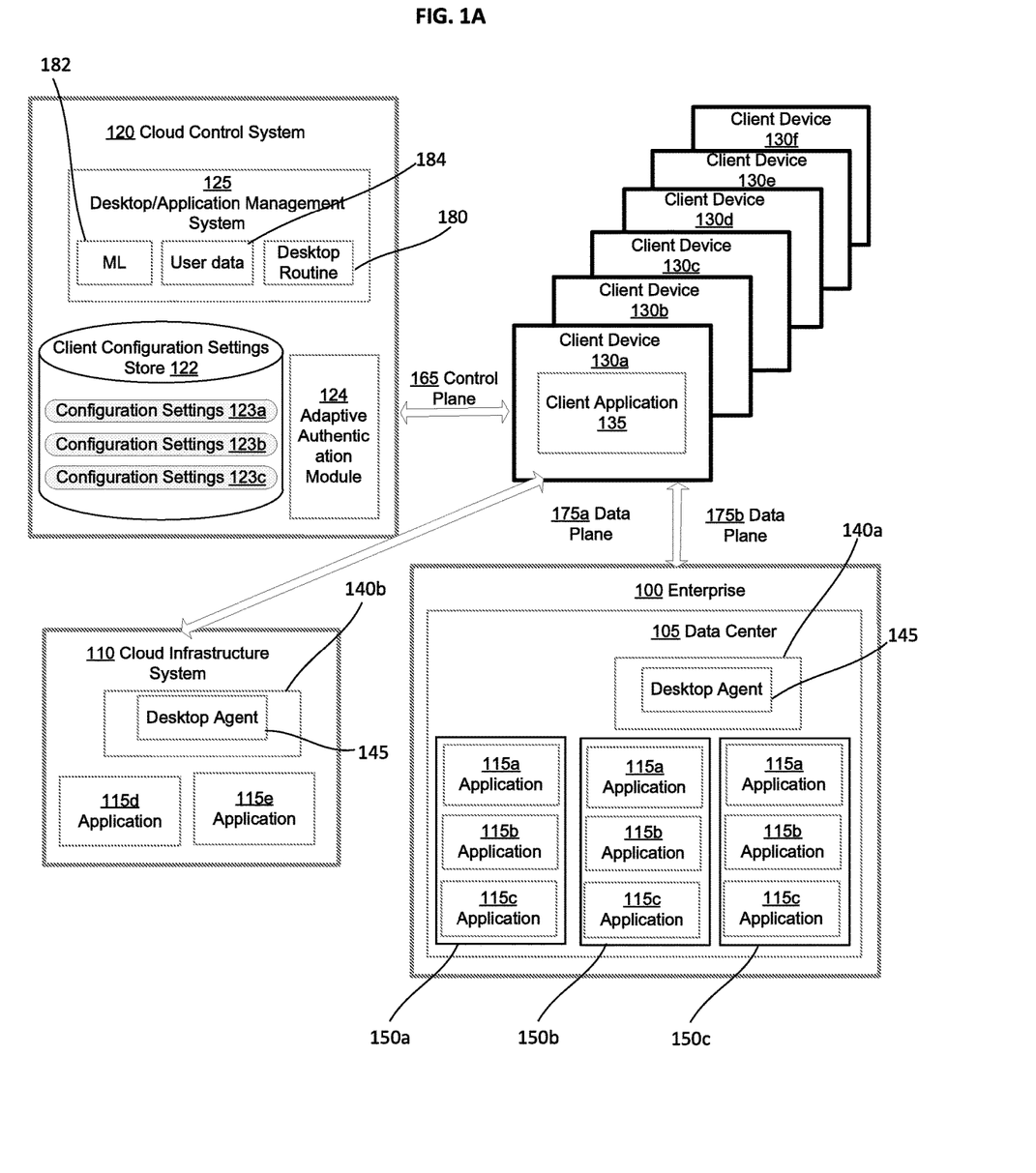
FIGS. 1A-1C are high-level block diagrams illustrating various embodiments of an environment for distributed software in a network environment.
Figure 1B:
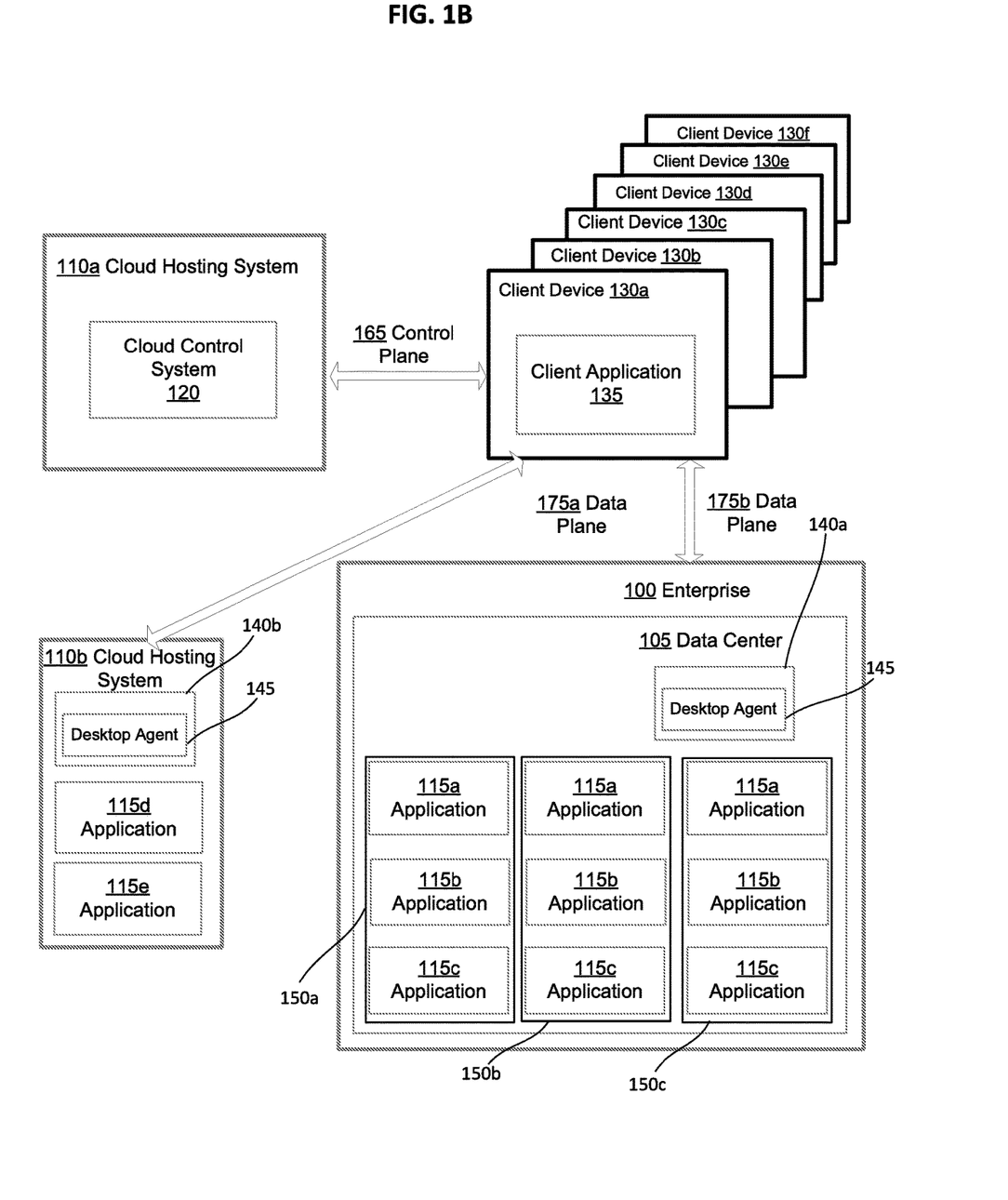
Figure 1C:
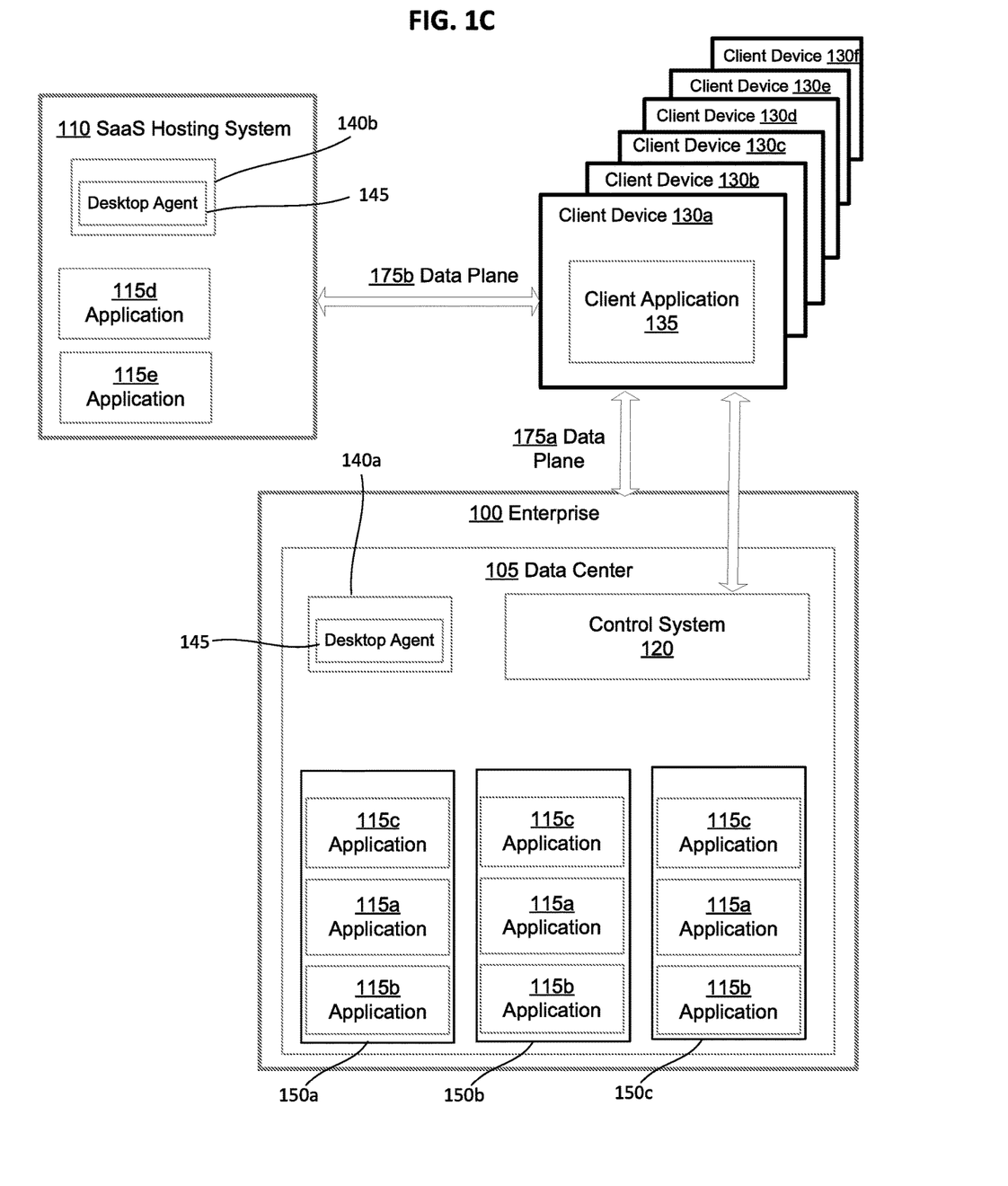

FIGS. 1A-1C are high-level block diagrams illustrating various examples of a network environment that activates desktops for different users on workstations or client devices. In one example, the environment comprises one or more enterprises 100, one or more software-as-a-service (SaaS) or cloud-hosting systems 110, one or more cloud control systems 120, and a plurality of workstations such as client devices 130. The client device 130 allows users to use applications 115 of the enterprise 100 as well as the SaaS or cloud applications 115. Other examples may have additional or fewer entities than those illustrated in FIG. 1, or may distribute functionality differently among the entities.

FIG. 1 and the other figures use like reference numerals to identify like elements. A letter after a reference numeral, such as "115 *a*," indicates that the text refers specifically to the element having that particular reference numeral. A reference numeral in the text without a following letter, such as "115," refers to any or all of the elements in the figures bearing that reference numeral (e.g., "115" in the text refers to reference numerals "115 *a*" and/or "115 *b*" in the figures).

The enterprise 100 allows users of the client devices 130 to access applications 115 associated with the enterprise 100. These include applications used for the business of the enterprise, such as ERP (enterprise resource planning) applications or CRM (customer relationship management) applications. These applications allow users to control the inventory of the business, sales, workflow, shipping, payment, product planning, cost analysis, interactions with customers, and so on. Applications associated with the enterprise 100 may include productivity applications, such as word processing applications, search applications, document viewers, and collaboration applications. Applications associated with the enterprise 100 may also include applications that allow communication between users such as email, messaging, web meetings, and so on. An enterprise is also referred to herein as a company.

The applications 115 associated with the enterprise may be hosted within data centers 105 that are managed by the enterprise. A data center 105 comprises servers such as servers 150 that host various applications 115 for the enterprise. A data center 105 typically comprises IT infrastructure that is managed by IT personnel of the enterprise. The IT infrastructure may include servers, network infrastructure, software, and so on. If there is an issue related to an application reported by a user, the IT personnel can check the health of the infrastructure used by the application. The data center 105 includes multiple servers such as application servers 150*a*, 150*b*, and 150*c*. The application servers 150*a*, 150*b*, and 150*c* may have one or more applications that may be accessed by different client devices 130.

In general, IT personnel control the management of the IT infrastructure of the data centers 105. Furthermore, one embodiment of the data center 105 includes a firewall to control access to the applications 115 hosted by the data center 105. The firewall enables computing devices behind the firewall to access the applications 115 hosted by the data center but prevents computing devices outside the firewall from directly accessing the applications 115. The firewall may allow devices outside the firewall to access the applications 115 within the firewall using a virtual private network (VPN). Users associated with the enterprise 100 (e.g., employees of the enterprise) use login credentials to access the applications 115 in the data center 105.

An application 115 may be a SaaS application or a cloud application that is hosted by a third-party system such as the cloud or a SaaS-hosting system 110. As shown in FIG. 1, applications 115 *d* and 115 *e* are hosted by the cloud-hosting system 110. SaaS applications or cloud applications may be accessed by the client devices 130 using a user interface such as a user interface of client application 135. The cloud-hosting system 110 is managed by a vendor that is typically independent of the IT department of the enterprise 100. Users often use different login credentials to access the applications hosted by the cloud-hosting system 110 than those used to access the applications hosted by the enterprise 100. Moreover, the applications 115 hosted by the cloud-hosting system 110 may have different security policies than the applications hosted by the enterprise 100.

A desktop 140 can be a virtual desktop or a virtual application hosted either in the enterprise 100 or cloud infrastructure system 110. The cloud infrastructure system 110 could be a public cloud offered by vendors such as Microsoft, Amazon, Google, etc. The cloud infrastructure system 110 could also be a private cloud managed by an enterprise. A desktop agent 145 may run inside a virtual desktop 140. The desktop agent 145 collects information on various activities, including user login, logoff, and disconnect. As will be explained below, the information collected by the desktop agent 145 may be used by the management system 125 to construct a user model. The binding between a user and a desktop can be persistent or non-persistent.

There are at least three ways a user can be associated with a desktop: (a) as a persistent desktop; (b) as a non-persistent desktop; and (c) as a remote desktop session host (RDSH). Each of these examples is described as follows. A persistent desktop is dedicated to the use of exactly one user, and all desktop states are maintained between connection sessions. A non-persistent desktop is dynamically assigned to a user for the duration of a connection session. The desktop state is cleared when the connection ends. An RDSH session describes a scenario in which a user can dynamically create a session in which they can use a desktop (or specific application) that is hosted by a multi-user desktop server, which furthermore can be provided as a cluster of services for scalability and reliability. Each of these kinds of desktop uses the concepts of "activation," "suspend," and "resume" in relation to the described examples. Activation is when a desktop is enabled for use to a user, either by creating it or transitioning it from temporarily inaccessible state to an accessible state. For example, this could mean powering on a virtual machine, or changing the mode of a desktop from dormant to active, or restoring it from a backup. When the desktop is made unavailable for use, the desktop is considered to be in a "suspended" or "suspend" state. For example, the desktop could be placed in a dormant state, or it could be powered down, or it could be backed up and the virtual machine deleted. When a suspended desktop is activated again, the desktop is considered "resumed." In other words, a special case of "activation" is when the desktop is activated following a "suspend" state. This case is defined by the term "resume." For example, a desktop is originally activated when it is created; later, it is suspended; sometime after that is it resumed and is now active again.

Users use the client device 130 to access the desktop 140. The client device 130 may be any device having computing and network functionality, such as a laptop computer, desktop computer, smartphone, or tablet. The client device 130 executes a client application 135 for communicating with the enterprise 100 and cloud-hosting system 110 to access the desktop 140 over a data plane 175. To access the desktop 140, a user opens and/or logs in to the client application 135. The client application 135 authenticates user access to the applications 115 when the client device 130 is outside a firewall of the enterprise 100. The client application 135 authenticates access to a requested application by sending login credentials to the data center 105 or cloud-hosting system 110. If access is authenticated, the client application 135 connects to a desktop 140a from the data center 105. The desktop 140 generates a desktop interface for the user. Alternatively, the desktop 140b may be stored on the cloud-hosting system 110, and the client device 130 accesses the cloud-hosting system 110. The client application 135 may also provide access to the desktop 140, while the client device 130 is behind the firewall of the enterprise 100.

The client application 135 accesses the desktop 140 that provides a user interface (virtual desktop). The user interface (desktop or application) is displayed on the client device 130 that is accessed by the specific user. Although most of the time, a specific user works on a specific client device 130, the client application 135 allows a user to work on any client device 130 that is part of the enterprise 100.

The cloud control system 120 manages communications between the client application 135, enterprise 100, and cloud-hosting system 110. The cloud control system 120 includes functions such as access control that is operated by an adaptive authentication module 124 and desktop management that is operated by a desktop management system 125. In the embodiment illustrated in FIG. 1A, the cloud control system 120 is external to the enterprise 100 and the cloud-hosting system 110. FIG. 1B illustrates an example in which the cloud control system 120 is hosted by a cloud-hosting system 110 a. FIG. 1C illustrates an example in which the cloud control system 120 is hosted by the data center 105 of the enterprise 100.

As illustrated in FIG. 1A, the cloud control system 120 communicates with the client application 135 via a control plane 165. The control plane 165 refers to information exchanged between the cloud control system 120 and client devices 130 that provide useful information for managing authentication to the applications 115. This is in contrast with the data plane 175, which comprises interactions between the client devices and the applications 115 hosted by the data centers 105 of the enterprise or by the cloud-hosting system 110. The interactions of the data plane 175 include the requests and response from the applications 115. Different example systems allow access control of client devices using information obtained from the control plane 165 rather than requiring the cloud control system 120 to necessarily operate within the data plane 175.

When a user requests access to an application 115 or the desktop 140, the client application 135 sends the request to the cloud control system 120. The cloud control system 120 determines an address of the requested application and a type of access control for the client application 135 based on a context of the request. The context is a set of variable factors associated with a particular application access request. In one embodiment, the context includes an identifier of the application being requested, the location of the client device 130 when the user requested access, and the time of the access request. Other factors that may be included in the context are the enterprise or company for which the device is being used, the type of network used by the client device, the client device type, the type of request for the application, or the type of parameters provided to a request. Using security policies associated with the enterprise 100 with which the user is associated, the cloud control system 120 determines the type of access control required for the user to access the requested application.

As will be explained below, the desktop management system 125 of the cloud control system 120 executes a desktop control routine 180 to provide user profiles based on operational data when desktops are accessed. The desktop management system 125 in this example includes a machine-learning module 182 that collects data and determines user profiles associated with system users for the purpose of predicting times for suspending or resuming the desktop 140. The collected data is stored in a user database 184 accessible by the desktop control routine 180 and the machine-learning module 182.

The client configuration settings store 122 stores configurations settings 123 for each client device 130. The configuration settings 123 include information specifying how the client application 135 is to establish communication with the applications 115, such as an address of a firewall of the enterprise 100, names and URLs of the applications 115, and authentication settings of the client application 135. In one embodiment, the configuration settings 123 further include a contextual model of a corresponding client application 135, indicating typical contexts of the client application 135. For example, a contextual model may identify an application commonly accessed by a user from a certain location at a certain time of day. In this case, the cloud control system 120 may use the contextual model to determine access control.

The systems and applications shown in FIG. 1 can be executed using computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, video game system, etc.

The interactions between the client devices 130, the cloud control system 120, enterprise 100, and the cloud-hosting system 110 are typically performed via a network such as the Internet. In one example, the network uses standard communications technologies and/or protocols. In another example, the entities can use custom and/or dedicated data communications technologies instead of, or in addition to, the ones described above. Depending upon the example, the network can also include links to other networks such as the Internet.

Figure 2:
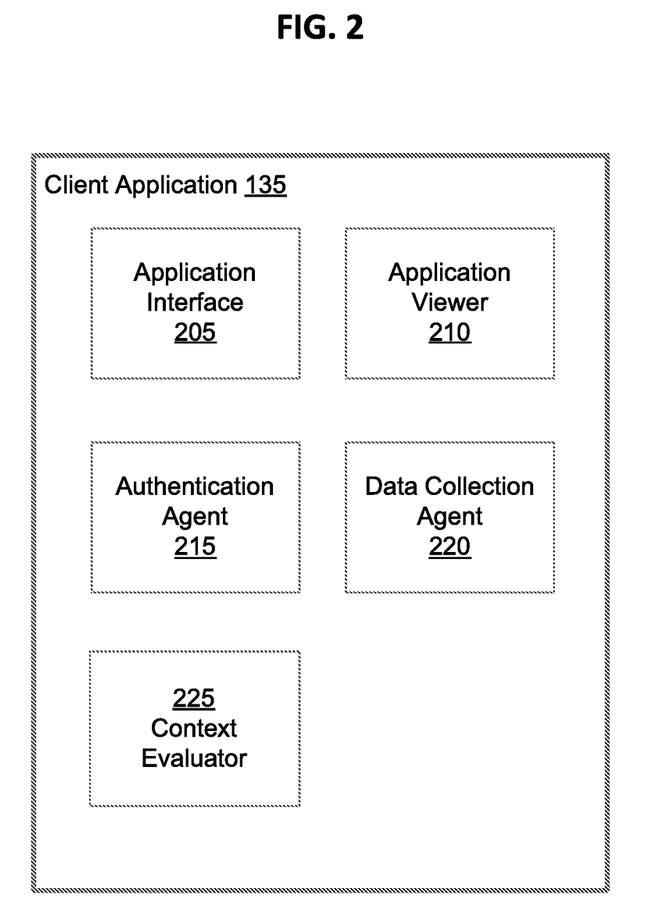
FIG. 2 is a block diagram illustrating system architecture of a client, according to one embodiment.

FIG. 2 is a block diagram illustrating system architecture of a client application 135, according to one example. In this example, the client application 135 comprises an application interface 205, an application viewer 210, an authentication agent 215, a data collection agent 220, and a context evaluator 225. Other examples may include more, less, or different components. Furthermore, functionality described herein may be implemented by modules other than those indicated in the description herein.

The application interface 205 allows access to the desktop 140 and the other applications 115 in the enterprise 100 or cloud-hosting system 110. In this example, the desktop 140 creates a virtual desktop interface for the user of a client device 130. The desktop 140 may use a remote desktop protocol, such as RDP, an open-source version of RDP, or some proprietary protocol for access by the client device 130. In one embodiment, the application interface 205 receives addresses of the applications 115 from the cloud control system 120, and uses the received addresses to access the applications 115. If the application 115 is hosted within the data center of the enterprise, the application interface 205 uses data channels (e.g., networks of the enterprise) to access the application. If the client device is located outside the firewall of the enterprise, the application interface 205 may use a VPN connection to access the application 115 within the enterprise. If the application 115 is hosted by a SaaS-hosting system or a cloud-hosting system, the application interface 205 uses networks outside the enterprise to access the application.

The application viewer 210 displays application data associated with the applications 115 or the desktop 140. In one embodiment, the client application 135 executes a plurality of application viewers 210, each configured to display different types of data. For example, the application viewer 210 may be one or more of a PDF viewer, web browser or HTML viewer, application-specific viewers, or viewers for other data types.

The authentication agent 215 authenticates client access to the applications 115 or the desktop 140. In one embodiment, the authentication agent 215 authenticates application access based on authentication policies received from the cloud control system 120. In one embodiment, the authentication agent 215 stores user login credentials for the applications 115. The authentication agent 215 may encrypt the stored credentials. When a user requests access to an application 115, the authentication agent 215 decrypts the stored credentials and sends the credentials to the data center 105 or cloud-hosting system 110 for authentication. In this case, the authentication agent 215 automatically logs a user into the data center 105 or cloud server 110 without the user manually entering credentials each time the user accesses an application. In other cases, the authentication agent 215 uses other information additional to or different from the stored credentials to authenticate access, such as manually entered credentials, biometric identification of the user, an authentication code sent to the client device 130, and so forth. In an embodiment, the authentication agent 215 uses the authentication mechanisms that are specific to certain client device types, including, but not limited to, username/password, hardware tokens, biometric, smart-cards/common access cards (CAC), voice recognition, face recognition, eye recognition, pattern locks (e.g., Android™ lock screen pattern lock), one-time passwords (OTP), and so on.

The data collection agent 220 collects data from the client device 130 describing interactions of the client application 135 with the applications 115 and the desktop 140. The data collection agent 220 may collect data when a user requests access to an application as well as throughout the user's interactions with the application. The collected data includes, for example, an identifier of the user requesting access, the application requested, an identifier of the client device 130, the location of the device 130 (e.g., geolocation or IP address), and the time of the request. The data collection agent 220 may also collect user experience data, such as response time of the applications or error codes. The data collection agent 220 sends the collected data to the cloud control system 120 for analysis.

The context evaluator 225 determines the context in which the client device is operating. The context of the client device describes the attributes of the current operation of the client device. For example, the same device may be used from different locations. The context evaluator 225 monitors changes in the attributes of the context of the client device. In an embodiment, the context evaluator 225 periodically checks if an attribute of the context has changed, for example, by monitoring changes in the location of the device.

Some of the attributes of the context may change more frequently than other attributes. For example, the location of the client device is likely to change at a higher frequency than the company for which the client device is being used. The frequency with which the context evaluator 225 checks whether an attribute has changed may depend on the type of attribute. In some embodiments, other applications may send a signal to the context evaluator 225 when an attribute of the context changes. If the context of the client device changes, the context evaluator 225 sends the new context to the IT management system.

In the example system in FIG. 1A and FIG. 2, the desktop agent 145 collects data tracking user login, disconnect, and logoff for every remote user of a desktop interface generated by the client application program 135 on any of the user devices 130. The collected data from the data collection agent 145 is transmitted to the cloud control system 120 periodically, such as every day or every logon or logoff. Alternatively, or in addition, the data may be obtained by the data collection agent 220 in FIG. 2. The desktop management system 125 stores the collected data in the user database 184 for analysis by the machine-learning module 182. The desktop management system 125 suspends the operation of the desktop 140 after a certain period where the user is idle on the user device 130. The desktop management routine 180 executed by the desktop management system 125 activates the desktops prior to a predicted start time needed by users if the client device is idle. The routine uses the connection history (times of login, logout, and disconnect) to build a desktop use profile for every user on a daily, weekly, or other time interval basis.

Using simple machine-learning techniques, the machine-learning module 182 creates a model for the times a desktop is in use for each of the users tracked by the respective desktop agent 145 on the desktop 140. In this example, the routine uses the model every night to predict what time the user will require the desktop during the respective active hours of the user during the day. In this example, the desktop management system 125 will resume the desktop 140 in the enterprise data center 100 or cloud infrastructure 110 at a predetermined time period before the predicted start time of the active hour. The predetermined time period may be configured by an IT administrator. In this example, the predetermined time period is thirty (30) minutes. Of course, other times may be used for resuming the desktop.

The desktop management system 125 will suspend the desktop for a client device after the first disconnect/logoff on the client device during the inactive period. The active/inactive time window is configurable by an IT administrator or may be automatically determined by the routine. The disconnection could be initiated after an explicit user disconnection or the disconnection could be triggered through the user idle time during the inactive period.

Figure 3:
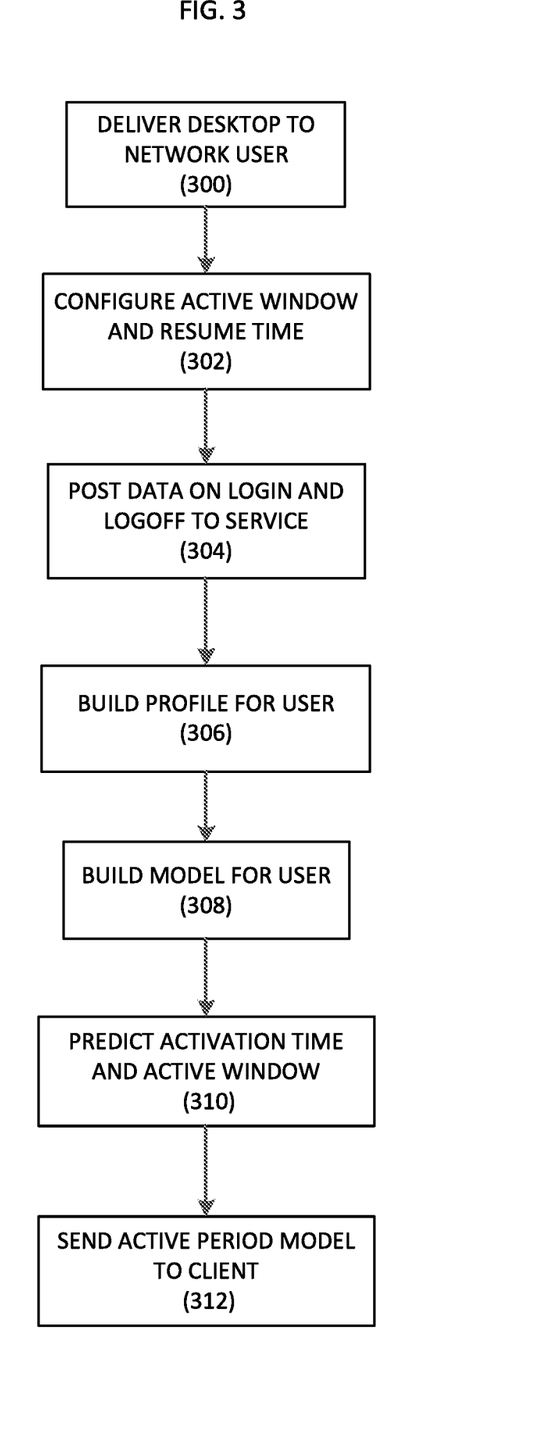
FIG. 3 is a flow diagram of the process to model activation times for network users.

FIG. 3 depicts a high-level view of the process of the routine used to predict the time to resume desktops, orchestrated by the desktop management system 125 of the cloud control system 120. The flow diagram in FIG. 3 is representative of example machine-readable instructions for the process of resuming desktops based on predicted patterns of users of the user devices 130, as orchestrated by the desktop management system 125. In this example, the machine-readable instructions comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit (ASIC), a programmable logic device (PLD), a field programmable logic device (FPLD), a field programmable gate array (FPGA), discrete logic, etc.). For example, any or all of the components of the interfaces can be implemented by software, hardware, and/or firmware. Also, some or all of the machine-readable instructions represented by the flowcharts may be implemented manually. Further, although the example algorithm is described with reference to the flowchart illustrated in FIG. 3, persons of ordinary skill in the art will readily appreciate that many other methods of implementing the example machine-readable instructions may alternatively be used. For example, the order of execution of the blocks may be changed, and/or some of the blocks described may be changed, eliminated, or combined.

The process in FIG. 3 may be executed by the desktop management system 125 running on a cloud or network-based system such as the cloud control system 120. The IT administrator first allows access to the desktops 140 by the user devices such as the client devices 130*a*-130*f* in FIG. 1A (300). For each accessed desktop, the IT administrator may configure the active window for the desktop usage and also the time interval in minutes, before the active window, for the desktop is to be resumed (302). The configuration may occur for all identical persistent desktops or similar non-persistent desktops, all users of the system, resource groups of users, users in the same geographic regions, or any other criteria.

The desktop 140 includes a desktop agent 145. The desktop agent 145 on the desktop 140 periodically posts user-connection history data about login, disconnect, and logoff to the desktop management system 125 (304). The desktop agent 145 may also collect performance data about the desktop virtual machine, possibly including CPU, memory, and network utilization, which can be especially useful for environments such as RDSH in which multiple users share virtual machine resources. The machine-learning module 182 collects the data from different desktops for various users and builds a profile for every user (306). For example, data such as a user has logged in to desktop VDI-001 at 08:45 a.m. on May 28, 2019, and a user disconnected from desktop VDI-002 at 12:48 p.m. on May 28, 2019 may be used to construct the start time, length of activity, and end time for the user. Using simple machine-learning techniques, the machine-learning module 182 creates a model of the user (308). For example, based on the usage patterns, the machine-learning module 182 may model a user works from office on Monday to Thursday from 10:00 a.m. to 6:00 p.m. and on Friday works from home from 9:00 a.m. to 5:00 p.m. In this example, every night using the model for the particular user, the routine predicts what time the user will come during the active time period and determines a predicted start time for the desktop for the user device 130 associated with the user as well as the time a user is active (310). Of course, the routine may make its prediction on a different interval, such as on a weekly or a monthly basis. Based on the model, the cloud control system 120 will cause the desktop 140 to resume before the user is ready to use the device 130 in the normal active window. In this example, the desktop 140 is resumed based on the configured time interval before the predicted start time, such as a start hour. Furthermore, the predicted active time period is sent to the client application 135 (312). The client application 135 may use the information to connect directly to a desktop it knows to be already activated based on the desktop management system 125's use of the same information.

Figure 4:
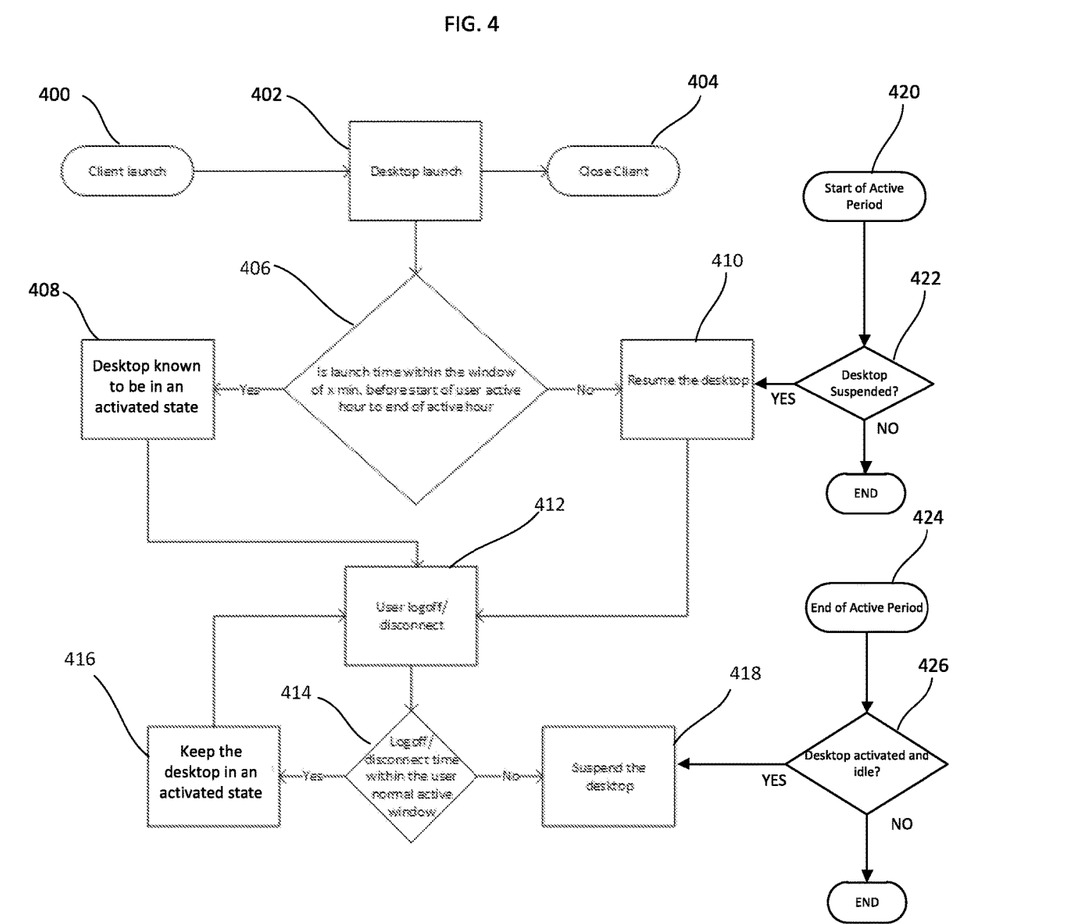
FIG. 4 is a flow diagram of the routine for the system in FIGS. 1A-1C for activating desktops for network users.

FIG. 4 depicts a flow diagram describing how the desktop management system 125 can orchestrate the suspending or resuming of desktops based on the model of times a user requires an activated desktop. This same logical process can be applied to different types of desktops, including, for example, persistent desktops, non-persistent desktops, and desktop sessions. The application program 135 is launched for a particular client device, when a user logs in on the client device (400). The appropriate desktop 140 is then accessed by the client device 130 the client application 135

(402). The client application 135 may be closed when the user logs off, and the client device 130 is disconnected from the network (404).

The routine determines whether the launch time of the desktop is within the window of a predetermined period before the active start time to the end of the active period (406). If the launch time is within the window of the active period specific to the user, the desktop is already resumed and is in a running state (408). If the launch time is not within the window, the desktop is resumed on demand of the user (410). The user may then log off or disconnect the client device from the network (412). The routine determines whether the logoff or disconnect is within the user normal active time window (414). If the logoff is within the normal active time window, the routine keeps the desktop activated (416). This allows the desktop to be instantly available to the user. The routine then loops back to detect the next logoff or disconnect (414).

If the logoff is not within the normal active time window for the user, the routine suspends the desktop as it is likely the user will not continue to require the use of the desktop (418). Thus, the desktop is suspended after the first disconnect/logoff during the inactive period of the day. The disconnection may be either an explicit disconnection by user command or a disconnection triggered through the idle period during inactive hours. In any case, when the end of the active period is reached if the desktop is activated but idle, it is suspended (418).

When the next active time of the user occurs (420), even without an attempted launch of a desktop by the user, the desktop management system 125 will determine if the desktop is suspended (422). If it is, the desktop is resumed (410), in anticipation that the user may soon require it to be available. If the desktop is not suspended, the routine is complete as the desktop is known to already be in an activated state (408) and resume is not required. At the end of the active period (424), the routine determines whether the desktop is activated and idle (426). If the desktop is activated and idle, the routine suspends the desktop (418). If the desktop is not activated or is not active, the suspend operation is not required, and the routine ends.

This diagram treats the terms "suspend" and "resume" in the abstract. The implementation can vary depending on the type of desktop. For instance, at least three different implementations could pertain to types of desktops, including persistent desktops, non-persistent desktops, and desktop sessions. When the desktop is a persistent desktop, suspend and resume can apply to a specific virtual machine that is allocated to the user. When suspended, the virtual machine is put into a state where it is using fewer resources and therefore minimizes the cost of running it.

In the case of non-persistent desktops, the implementation of suspend and resume can be accomplished by managing the activated size of a pool of unassigned desktops. In this case, the desktop management system 125 can implement the concept of desktop suspension by reducing the number of activated desktops in the pool. It can implement the concept of desktop resumption by increasing the number of desktops in the pool that are activated.

In the case of a desktop that is actually a RDSH session, the implementation of suspend and resume could be as follows. The resume routine executed by the desktop management system 125 may analyze overall user log-on-time patterns and collect virtual machine historical performance data to determine that the current capacity of application servers in the data center 105 or servers accessible by the cloud-hosting system 110 is adequate. Alternatively, it may determine that additional application servers in the data center 105 or the cloud-hosting system 110 need to be activated. For example, if users on the client devices 130a-130c log on to the network during a certain similar time based on their user profiles, the routine may activate a first server such as the server 150a around the predicted overall user log on time and/or performance data to allow access to the applications executed by the server 150a. If at a second time, the user profiles indicate additional users such as users of client devices 130d-130f will be active, depending on historical performance data and the current load, the routine may activate an additional application server such as the server 150b to make applications available to the now additional users. Similarly, if the individual profiles indicate there will be fewer active users at a future time, the routine may deactivate application servers that are no longer needed.

Figure 5:
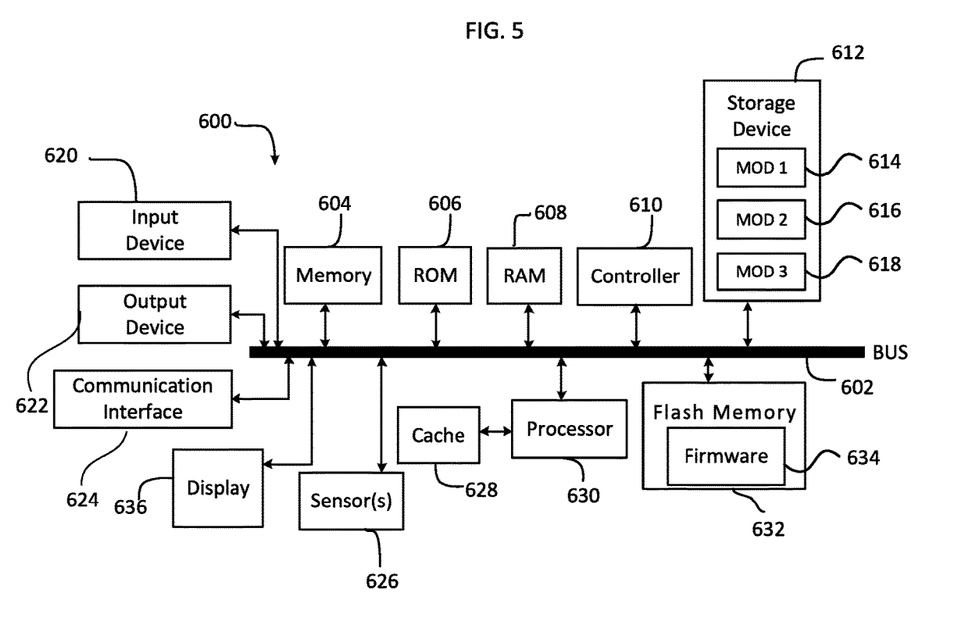
FIGS. 5 and 6 illustrate exemplary systems in accordance with various examples of the present disclosure.

FIG. 5 illustrates an example computing system 600, in which the components of the computing system are in electrical communication with each other using a bus 602. The system 600 includes a processing unit (CPU or processor) 630; and a system bus 602 that combines various system components, including the system memory 604 (e.g., read-only memory (ROM) 606 and random-access memory (RAM) 608) to the processor 630. The system 600 can include a cache of high-speed memory connected directly with, in close proximity to, or integrated as part of the processor 630. The system 600 can copy data from the memory 604 and/or the storage device 612 to the cache 628 for quick access by the processor 630. In this way, the cache can provide a performance boost for processor 630 while waiting for data. These and other modules can control or be configured to control the processor 630 to perform various actions. Other system memory 604 may be available for use as well. The memory 604 can include multiple different types of memory with different performance characteristics. The processor 630 can include any general-purpose processor and a hardware module or software module, such as module 1 614, module 2 616, and module 3 618 embedded in storage device 612. The hardware module or software module is configured to control the processor 630, as well as a special-purpose processor where software instructions are incorporated into the actual processor design. The processor 630 may essentially be a completely self-contained computing system that contains multiple cores or processors, a bus, memory controller, cache, etc. A multi-core processor may be symmetric or asymmetric.

To enable user interaction with the computing device 600, an input device 620 is provided as an input mechanism. The input device 620 can comprise a microphone for speech, a touch-sensitive screen for gesture or graphical input, keyboard, mouse, motion input, and so forth. In some instances, multimodal systems can enable a user to provide multiple types of input to communicate with the system 600. In this example, an output device 622 is also provided. The communications interface 624 can govern and manage the user input and system output.

Storage device 612 can be a non-volatile memory to store data that is accessible by a computer. The storage device 612 can be magnetic cassettes, flash memory cards, solid-state memory devices, digital versatile disks, cartridges, RAM 608, ROM 606, and hybrids thereof.

The controller 610 can be a specialized microcontroller or processor on the system 600, such as a BMC (baseboard management controller). In some cases, the controller 610 can be part of an intelligent platform management interface (IPMI). Moreover, in some cases, the controller 610 can be embedded on a motherboard or main circuit board of the system 600. The controller 610 can manage the interface between system management software and platform hardware. The controller 610 can also communicate with various system devices and components (internal and/or external), such as controllers or peripheral components, as further described below.

The controller 610 can generate specific responses to notifications, alerts, and/or events, and communicate with remote devices or components (e.g., electronic mail message, network message, etc.) to generate an instruction or command for automatic hardware recovery procedures, etc. An administrator can also remotely communicate with the controller 610 to initiate or conduct specific hardware recovery procedures or operations, as further described below.

The controller 610 can also include a system event-log controller and/or storage for managing and maintaining events, alerts, and notifications received by the controller 610. For example, the controller 610 or a system event-log controller can receive alerts or notifications from one or more devices and components, and maintain the alerts or notifications in a system event-log storage component.

Flash memory 632 can be an electronic non-volatile computer storage medium or chip that can be used by the system 600 for storage and/or data transfer. The flash memory 632 can be electrically erased and/or reprogrammed. Flash memory 632 can include EPROM (erasable programmable read-only memory), EEPROM (electrically erasable programmable read-only memory), ROM, NVRAM, or CMOS (complementary metal-oxide-semiconductor), for example. The flash memory 632 can store the firmware 634 executed by the system 600 when the system 600 is first powered on, along with a set of configurations specified for the firmware 634. The flash memory 632 can also store configurations used by the firmware 634.

The firmware 634 can include a Basic Input/Output System or equivalents, such as an EFI (Extensible Firmware Interface) or UEFI (Unified Extensible Firmware Interface). The firmware 634 can be loaded and executed as a sequence program each time the system 600 is started. The firmware 634 can recognize, initialize, and test hardware present in the system 600 based on the set of configurations. The firmware 634 can perform a self-test, such as a POST (Power-On-Self-Test), on the system 600. This self-test can test the functionality of various hardware components such as hard disk drives, optical reading devices, cooling devices, memory modules, expansion cards, and the like. The firmware 634 can address and allocate an area in the memory 604, ROM 606, RAM 608, and/or storage device 612, to store an operating system (OS). The firmware 634 can load a boot loader and/or OS, and give control of the system 600 to the OS.

The firmware 634 of the system 600 can include a firmware configuration that defines how the firmware 634 controls various hardware components in the system 600. The firmware configuration can determine the order in which the various hardware components in the system 600 are started. The firmware 634 can provide an interface, such as a UEFI, that allows a variety of different parameters to be set, which can be different from parameters in a firmware default configuration. For example, a user (e.g., an administrator) can use the firmware 634 to specify clock and bus speeds; define what peripherals are attached to the system 600; set monitoring of health (e.g., fan speeds and CPU temperature limits); and/or provide a variety of other parameters that affect overall performance and power usage of the system 600. While firmware 634 is illustrated as being stored in the flash memory 632, one of ordinary skill in the art will readily recognize that the firmware 634 can be stored in other memory components, such as memory 604 or ROM 606.

System 600 can include one or more sensors 626. The one or more sensors 626 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 626 can communicate with the processor, cache 628, flash memory 632, communications interface 624, memory 604, ROM 606, RAM 608, controller 610, and storage device 612, via the bus 602, for example. The one or more sensors 626 can also communicate with other components in the system via one or more different means, such as inter-integrated circuit (I2C), general-purpose output (GPO), and the like. Different types of sensors (e.g., sensors 626) on the system 600 can also report to the controller 610 on parameters, such as cooling fan speeds, power status, operating system (OS) status, hardware status, and so forth. A display 636 may be used by the system 600 to provide graphics related to the applications that are executed by the controller 610.

Figure 6:
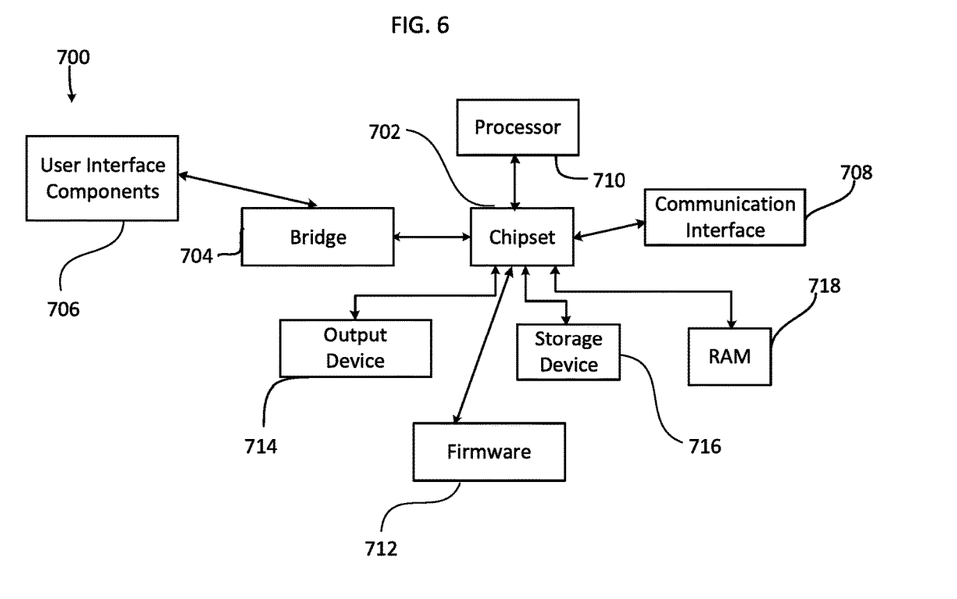

FIG. 6 illustrates an example computer system 700 having a chipset architecture that can be used in executing the described method(s) or operations, and generating and displaying a graphical user interface (GUI). Computer system 700 can include computer hardware, software, and firmware that can be used to implement the disclosed technology. System 700 can include a processor 710, representative of a variety of physically and/or logically distinct resources capable of executing software, firmware, and hardware configured to perform identified computations. Processor 710 can communicate with a chipset 702 that can control input to and output from processor 710. In this example, chipset 702 outputs information to output device 714, such as a display, and can read and write information to storage device 716. The storage device 716 can include magnetic media, and solid-state media, for example. Chipset 702 can also read data from and write data to RAM 718. A bridge 704 for interfacing with a variety of user interface components 706, can be provided for interfacing with chipset 702. User interface components 706 can include a keyboard, a microphone, touch detection and processing circuitry, and a pointing device, such as a mouse.

Chipset 702 can also interface with one or more communication interfaces 708 that can have different physical interfaces. Such communication interfaces can include interfaces for wired and wireless local area networks, for broadband wireless networks, and for personal area networks. Further, the machine can receive inputs from a user via user interface components 706, and execute appropriate functions, such as browsing functions by interpreting these inputs using processor 710.

Moreover, chipset 702 can also communicate with firmware 712, which can be executed by the computer system 700 when powering on. The firmware 712 can recognize, initialize, and test hardware present in the computer system 700 based on a set of firmware configurations. The firmware 712 can perform a self-test, such as a POST, on the system 700. The self-test can test the functionality of the various hardware components 702-718. The firmware 712 can address and allocate an area in the memory 718 to store an OS. The firmware 712 can load a boot loader and/or OS, and give control of the system 700 to the OS. In some cases, the firmware 712 can communicate with the hardware components 702-710 and 714-718. Here, the firmware 712 can communicate with the hardware components 702-710 and 714-718 through the chipset 702, and/or through one or more other components. In some cases, the firmware 712 can communicate directly with the hardware components 702-710 and 714-718.

It can be appreciated that example systems 600 (in FIG. 6) and 700 can have more than one processor (e.g., 630, 710), or be part of a group or cluster of computing devices networked together to provide greater processing capability.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform a specific function; software stored on a computer-readable medium; or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A system resuming a remote desktop accessed by a networked client device comprising:

a control system accepting login data from a user input to a networked client device;

a remote server that allows a stored desktop to be accessed by the networked client device when the control system validates the login data from the user input; and wherein the control system suspends the desktop when the user is inactive in operating the client device;

wherein the control system is operable to activate the desktop for the networked client device a predetermined time period before a predicted start time, wherein the predicted start time is based on login data from past logins by the user on one or more client devices; and wherein the control system is operative to suspend the desktop after a logoff from the client device outside of a normal active time window, wherein the normal active time window is determined based on past logins.

2. The system of claim 1, wherein the control system accepts login data from an agent running on the desktop.

3. The system of claim 1, wherein the predicted start time is determined by machine learning.

4. The system of claim 1, wherein the control system builds a desktop use profile for the user based on past logins.

5. The system of claim 1, wherein the computer system includes a plurality of users and a plurality of client devices, and wherein the control system predicts a start time for each of the plurality of users.

6. The system of claim 1, wherein the control system is operative to keep the desktop activated if the logoff is within the normal active time window.

7. The system of claim 1, wherein the control system updates the predicted start on a periodic basis based on times of logins.

8. The system of claim 1, wherein the control system and the remote server are executed on one of a cloud hosting system or a data center.

9. The system of claim 1, wherein the desktop is one of a persistent desktop or a non-persistent desktop.

10. The system of claim 1, wherein the networked client device includes a client application to access the desktop.

11. The system of claim 1, wherein the desktop is a Remote Desktop Session Host (RDSH) session.

12. The system of claim 11, wherein the activation includes activating another remote server based on the predicted start time.

13. A method of activating a desktop on an idle client device operating a client application in a network system, the method comprising:

accepting login data from a user input to the client device via a control system;

validating the login data from the user;

allowing access to a desktop on a remote server to the networked client device from over the network;

suspending the desktop when the user is inactive in operating the client device;

activating the desktop for the networked client device a predetermined time period before a predicted start time, wherein the predicted start time is based on login data from past logins by the user on one or more client devices; and suspending the desktop after a logoff from the client device outside of a normal active time window, wherein the normal active time window is determined based on past logins.

14. The method of claim 13, wherein the predicted start time is determined by machine learning.

15. The method of claim 13, further comprising building a desktop use profile for the user via the control system.

16. The method of claim 13, wherein the network system includes a plurality of users and a plurality of client devices, and wherein a start time is predicted for each of the plurality of users.

17. The method of claim 13, further comprising keeping the desktop activated if the logoff is within the normal active time window.

18. The method of claim 13, wherein the desktop includes a data collection agent that collects the times of the login of the user.

19. The method of claim 13, further comprising updating the predicted start time on a periodic basis based on times of logins.

20. The method of claim 13, wherein the desktop is one of a persistent desktop or a non-persistent desktop.

21. The method of claim 13, wherein the desktop is a Remote Desktop Session Host (RDSH) session.

22. The method of claim 21, further comprising activating another remote server based on the predicted start time.

23. A system that determines a time to activate a desktop for a networked client device, the system comprising:
- an access control system accepting login data from a user input to the networked client device;
- a remote server storing a desktop that is accessed by the networked client device when the control system validates the login data from the user input;
- wherein the control system is operable to determine a predicted start time associated with the user, wherein the predicted start time is based on login data from past logins by the user on networked client devices, and
- wherein the control system is operable to determine a time to suspend the desktop after a logoff from the client device outside of a normal active time window, wherein the normal active time window is determined based on past login.

* * * * *

UNITED STATES PATENT AND TRADEMARK OFFICE
CERTIFICATE OF CORRECTION

| | | |
|---|---|---|
| PATENT NO. | : 11,475,111 B2 | Page 1 of 1 |
| APPLICATION NO. | : 16/593782 | |
| DATED | : October 18, 2022 | |
| INVENTOR(S) | : Shiva Madishetti et al. | |

It is certified that error appears in the above-identified patent and that said Letters Patent is hereby corrected as shown below:

In the Claims

At Column 18, Lines 17-18 (Claim 23), please delete "is determined based on past login" and insert --is determined based on past logins-- therefor.

Signed and Sealed this
Twenty-eighth Day of February, 2023

Katherine Kelly Vidal
*Director of the United States Patent and Trademark Office*